United States Patent
Hayashi

Patent Number: 6,118,550
Date of Patent: Sep. 12, 2000

[54] IMAGE PROCESSING APPARATUS

[75] Inventor: Shuji Hayashi, Osaka, Japan

[73] Assignee: Kyocera Mita Corporation, Osaka, Japan

[21] Appl. No.: 09/017,641

[22] Filed: Feb. 2, 1998

[30] Foreign Application Priority Data

Feb. 19, 1997 [JP] Japan ..................... 9-035100

[51] Int. Cl.$^7$ ............................................. H04N 1/21
[52] U.S. Cl. .................. 358/296; 358/1.9; 358/529; 358/518; 358/521
[58] Field of Search .................. 358/1.9, 529, 518, 358/521; 382/296, 162

[56] References Cited

U.S. PATENT DOCUMENTS

| | | | |
|---|---|---|---|
| 5,293,207 | 3/1994 | Haneda | 358/518 |
| 5,459,590 | 10/1995 | Bleker et al. | 358/529 |
| 5,508,827 | 4/1996 | Po-Chieh | 358/518 |
| 5,555,107 | 9/1996 | Funada et al. | 358/518 |
| 5,592,310 | 1/1997 | Sugiura | 358/518 |
| 5,703,694 | 12/1997 | Ikeda et al. | 358/529 |
| 5,936,749 | 8/1999 | Ikeda | 358/518 |

*Primary Examiner*—Jerome Grant, II
*Assistant Examiner*—Kevin Kianni
*Attorney, Agent, or Firm*—Jordan and Hamburg LLP

[57] ABSTRACT

This invention relates to an image processing apparatus. A black data generator of the image processing apparatus is operated such that a calculator solves the equation (1) using a maximum value, max(C,M,Y), detected by a maximum value detector, a minimum value, min(C,M,Y), detected by a minimum value detector, and a coefficient $\beta$ as parameters to output a black weight indicia $\alpha$ for black data:

$$\alpha - 1 - \{\max(C,M,Y) - \min(C,M,Y)\}/\beta \qquad (1)$$

A multiplier solves the equation (2) to output a value K for the black data:

$$K = \alpha \cdot \min(C,M,Y) \qquad (2)$$

Then, a character UCR converter, a photography UCR converter, and a halftone dot UCR converter output an output value BK for the black data corresponding to the value K as address data.

9 Claims, 4 Drawing Sheets

IMAGE PROCESSING APPARATUS

BACKGROUND OF THE INVENTION

1. Field of the Invention

This invention relates to an image processing apparatus for processing color image data based on read color image of an original document, and more particularly to an improvement of an image processing apparatus in which black data is accurately generated to utilize the generated black data in processing the color image data.

2. Description of the Prior Art

Generally, electrophotographic digital color copiers are operated such that: photoelectric conversion elements such as CCDs receive light reflected from an illuminated document of a color image via a color separation filter of red (R), green (G), and blue (B) to separate color image data into light receiving signals of R, G, and B respectively indicative of light intensity of color components of red, green, and blue, an analog-to-digital (A/D) converter converts the light receiving signals into a digital value, and a density converter converts the digital values of color components of R, G, and B into color density data of cyan (C), magenta (M), and yellow (Y). Subsequently, black data k is generated based on the obtained color image data of C, M, Y, and under color removal (UCR) process is effected for the color image data of C, M, Y based on the generated black data k.

Black data generation and UCR process are effected to suppress consumption of color toners of C, M, and Y and to improve reproductivity of shadowed areas and character images, because in these processings, part of color image data of C, M, and Y is converted into black data (black data generation), and the level of color image data of C, M, and Y is lowered by the level corresponding to the thus obtained black data (under color removal).

The digital values of color image data of C, M, and Y are identical to one another means that the color image to be produced is supposed to be black. In other words, black data k is produced corresponding to the minimum value of C, M, Y, and is represented by the following equation:

$$k = \min(C, M, Y)$$

It should be noted that the spectral transmittance of an actually used color separation filter of R, G, and B does not exhibit the ideal characteristic, and the actual spectral transmittance of the color separation filter partially overlies in the boundary between red and green, and green and blue. Accordingly, when a color image document is read by CCDs via a color separation filter, color image data of G becomes larger than the ideal one which should be visible to human eyes because the spectral transmittance of G partially overlies in the area of R and B.

Thereby, black data k obtained from the above equation, $k = \min(C, M, Y)$, becomes larger than the ideal value because of the general tendency of overlying character as described above. When such large black data k is utilized, there was a problem that green data or blue data, particularly green data that does not inherently contain black data is affected by the large black data k, thereby darkening the green color (undesirable mingle of black color).

To avoid such undesirable mingle of black color into green or blue, there has been proposed a technology in which the black data k is converted into an output value k' such that k' is set at 0 when the black data k is in the range from 0 to a certain value, and the output value k' is used as a parameter for UCR process.

Specifically, according to this conversion process, to completely shut out mingle of black color into green color, k' is set at 0 when $0 \leq k \leq 150$ wherein the unit of k and k' is the gradation level ranging from 0 to 255. According to this process, the output level of black is suppressed to 0 for a relatively wide range from 0 to 150. As a result, black data generation is exceedingly suppressed for the wide range from 0 to 150. This does not contribute to the saving of consumption of color toners of C, M, and Y, and hinders improvement of reproductivity of shadowed areas and character images.

To eliminate the above drawback, there has been proposed an idea of setting the output value k' for black data in the following manner as shown in FIG. 6:

k'=0 when $0 \leq k \leq 60$; and k'>0 when k>60.

According to this two-stage setting process, after k>60, the output value k' gradually rises as the black data k increases. However, on the way of rise of gradation level, i.e., $k \approx 60$, the output value k' abruptly rises from 0 to a certain level. At this time, one of color image data C, M, and Y has already reached the gradation level of 60 since min(C, M, Y)$\geq$60. Accordingly, the amount of black toner rapidly increases around the gradation level of $k \approx 60$, thereby resulting in an undesirable formation of an obscure black image (pseudo-contour-image). Thus, this two-stage setting process is not effective in completely preventing mingle of black color into other colors, and impairs reproductivity of copied image.

SUMMARY OF THE INVENTION

It is an object of the invention to overcome the aforementioned drawbacks in the conventional technology.

It is another object of the invention to provide an image processing apparatus that enables prevention of mingle of black color into other colors by accurately generating black data.

This invention is directed to an image processing apparatus comprising: a color separator for separating inputted image into a plurality of colors for each pixel to generate color image data; a maximum value detector for detecting a maximum value of the color image data; a minimum value detector for detecting a minimum value of the color image data; and a black data generator for generating black data by using the difference between the maximum value and the minimum value of the color image data and the minimum value of the color image data as parameters to set an output value for the black data.

With this arrangement, the maximum value and the minimum value of the image data of plural colors are detected for each pixel of the inputted image, and the output value for the black data is generated by using the difference between the maximum value and the minimum value and the minimum value as parameters. Thereby, optimum black data is generated.

The above and other objects, features and advantages of the present invention will become more apparent upon a reading of the following detailed description and drawings.

DETAILED DESCRIPTION OF THE INVENTION

Figure 1:
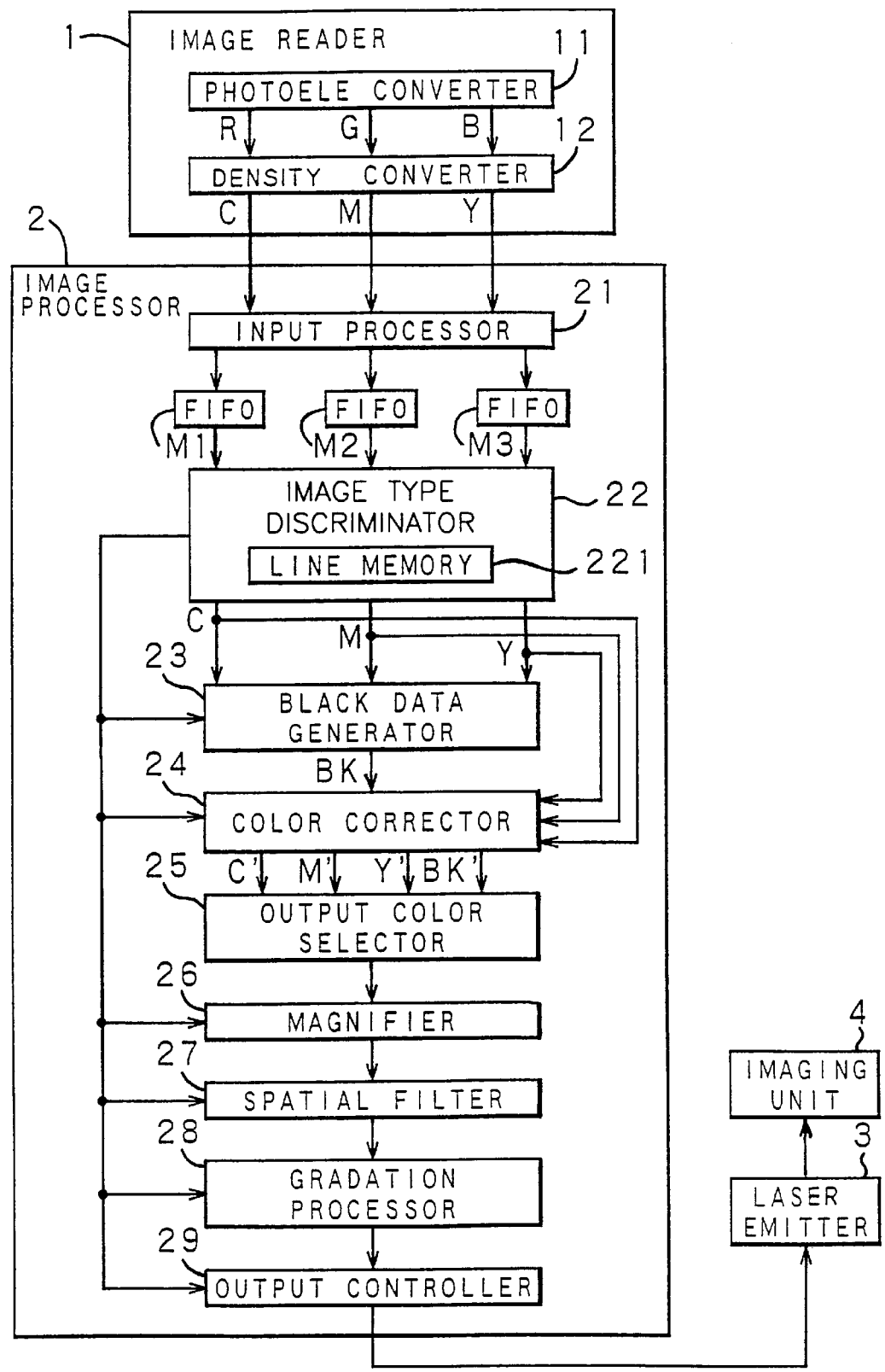
FIG. 1 is a block diagram showing an embodiment of a color digital copier incorporated with an image processing apparatus according to this invention.

An embodiment of an image processing apparatus according to this invention is described with reference to the accompanying drawings. FIG. 1 is a block diagram showing an embodiment of a color digital copier incorporated with the image processing apparatus of this invention.

As shown in FIG. 1, the color digital copier comprises an image reader 1, an image processor 2, a laser emitter 3, and an imaging unit 4.

The image reader 1 includes an unillustrated light projector for projecting light onto an original document of a color image (hereinafter merely referred to as a "color document") for which the image is to be read, a photoelectric converter 11, and a density converter 12. With this constituent elements, the color document image is read to generate color image data of cyan (C), magenta (M), and yellow (Y).

The image processor 2 comprises an input processor 21, an image type discriminator 22, a black data generator 23, a color corrector 24, an output color selector 25, a magnifier 26, a spatial filter 27, a gradation processor 28, and an output controller 29 to effect predetermined processes to color image data of C, M, and Y which have been generated by the image reader 1. The various processes in the image processor 2 will be described later in detail.

The laser emitter 3 emits laser light onto a photoreceptor of the imaging unit 4 which have been charged to a certain potential level according to the color image data processed by the image processor 2 to form an electrostatic latent image on the surface of the photoreceptor.

The imaging unit 4 includes the photoreceptor, a developing unit, a copy sheet transport unit, and a fixing unit which are not shown in the drawings. The imaging unit 4 is adapted for developing an electrostatic latent color image formed on the photoreceptor surface into color toner images of cyan (C), magenta (M), yellow (Y), and toner image of black (BK) successively to transfer the toner images to a copy sheet transported to the photoreceptor, and for fixing the transferred toner images onto the copy sheet.

The photoelectric converter 11 of the image reader 1 functions as a color separator. Specifically, the photoelectric converter 11 comprises a number of Charge Coupled Devices (CCDS) that are arrayed in a line. More specifically, the photoelectric converter 11 comprises photoelectric conversion elements each for receiving light reflected from a very small area (hereinafter merely referred to as a "pixel") of a projected color document, a color filter of red (R), green (G), and blue (B) arranged on a path of reflected light from the pixel, and an analog-to-digital (A/D) converter. The colors of R, G, and B are three primary colors according to additive color process.

The electric conversion elements convert the reflected light of R, G, and B into analog color image signals of these three primary colors in accordance with light intensity of color components of R, G, and B. The A/D converter converts the analog color image signals into digital color image data of R, G, and B of a certain bit (in this embodiment, 8 bit).

The density converter 12 converts the digital color image data of R, G, and B into color image data of cyan (C), magenta (M), and yellow (Y) in accordance with density of these three colors C, M, and Y. The colors of C, M, Y are complementary colors of R, G, and B respectively and are primary colors according to subtractive color process.

The input processor 21 of the image processor 2 converts a frequency of a reference clock signal generated in the image reader 1 into that in the image processor 2 when the color image data of C, M, and Y are transmitted to the image processor 2. With the conversion of the frequency by the input processor 21, a difference between the reference clock frequencies generated in the image reader 1 and in the image processor 2 is diminished.

After conversion of the frequency, the input processor 21 stores the color image data of C, M, and Y in storage units M1, M2, and M3 respectively. The storage units M1, and M2, and M3 are first-in first-out (FIFO) memories.

The image type discriminator 22 includes a line memory 221 storable of color image data of plural lines. The color image data of C, M, and Y of plural lines that have been stored in the FIFO memories M1, M2, and M3 are read out therefrom and stored in the line memory 221. The image type discriminator 22 judges whether the read out color image data is the data in a character region, photography region, or in a halftone dot region based on the color image data of plural lines stored in the line memory 221.

The image judging method conducted by the image type discriminator 22 is a well-known method as disclosed in Japanese Unexamined Patent Publication No. HEI 8-149298. As shown in FIG. 1, the judgement result by the discriminator 22 is outputted to the black data generator 23, the color corrector 24, the magnifier 26, the spatial filter 27, the gradation processor 28 and to the output controller 29.

The image type discriminator 22 synchronously reads out the color image data of C, M, Y for the identical pixel (target pixel) that have been respectively stored in the FIFO memories M1, M2, and M3 to output the read data to the black data generator 23.

The black data generator 23 generates image data of black BK based on the color image data of C, M, and Y. The color corrector 24 corrects the color image data of C, M, and Y based on the generated black data BK. Operations of the black data generator 23 and the color corrector 24 will be described later in detail.

The output color selector 25 selectively outputs one image data among the image data of C, M, Y, and BK. The magnifier 26 magnifies or reduces the selected image data according to the set magnification/reduction ratio.

The spatial filter 27 performs a well-known filtering process such as edge emphasis and smoothing according to the contents of the judgement result outputted from the image type discriminator 22. Specifically, when the judgement result is that the pixel data belongs to the character region, the data is subject to edge emphasis. When the judgement result is that the data belongs to the photography region or the halftone dot region, the data is subject to smoothing.

The gradation processor 28 performs a well-known gradation correction such as dithering and multi-valued dithering. The output controller 29 controls light emission of the laser emitter 3 according to the image data outputted from the gradation processor 28.

Figure 2:
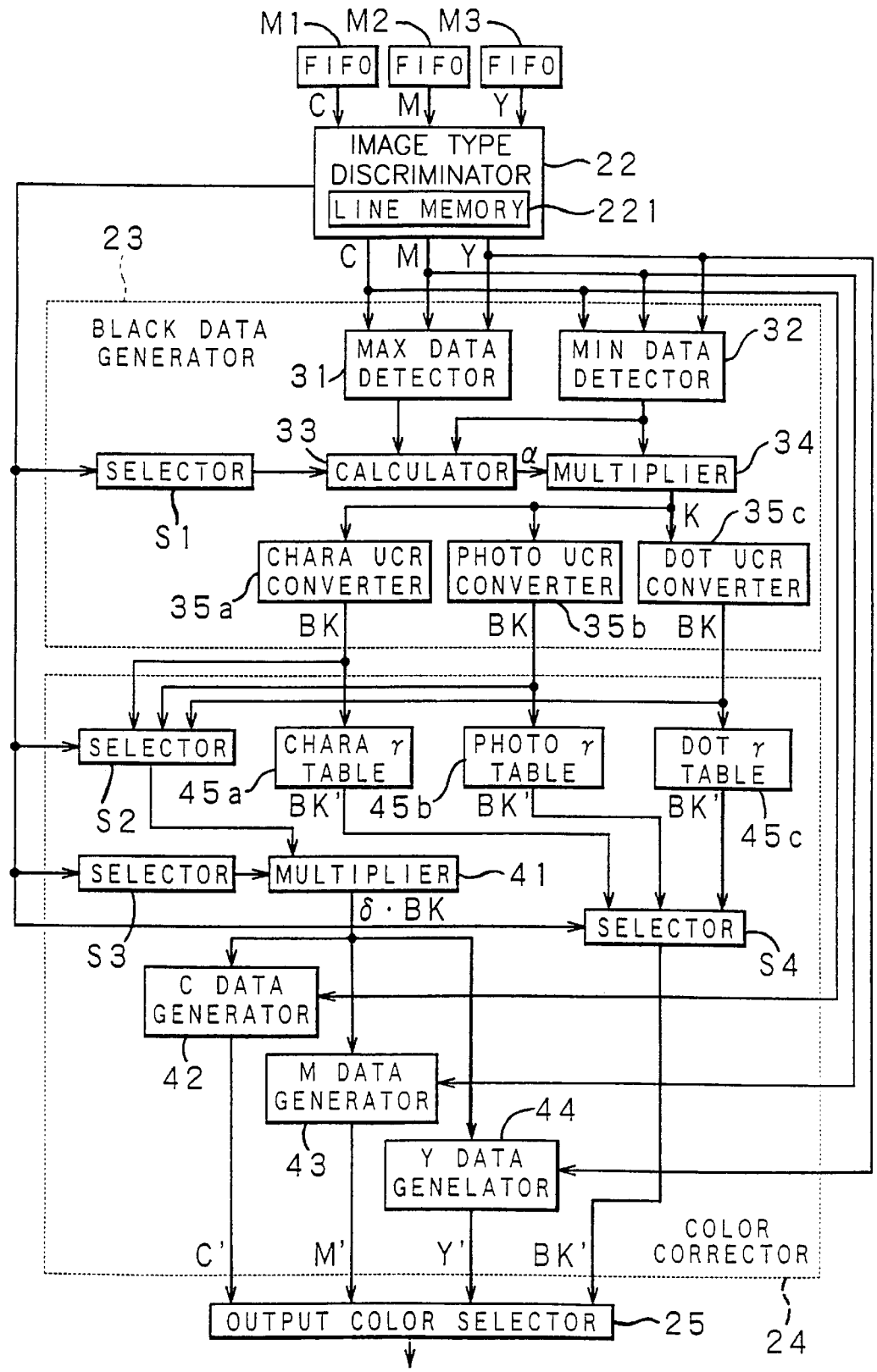
FIG. 2 is a block diagram showing an arrangement of a black data generator and a color corrector of the image processing apparatus.

Next, an arrangement of the black data generator 23 and the color corrector 24 is described with reference to FIG. 2. FIG. 2 is a block diagram showing the arrangement of the black data generator 23 and the color corrector 24 of this embodiment.

The black data generator 23 consists of a logic circuit, and comprises a maximum data detector (MAX data detector) 31, a minimum data detector (MIN data detector) 32, a calculator 33, a multiplier 34, a character UCR converter 35a, a photography UCR converter 35b, a halftone dot UCR converter 35c, and a selector S1.

The color corrector 24 also consists of a logic circuit, and comprises a multiplier 41, a cyan data generator (C data generator) 42, a magenta data generator (M data generator) 43, a yellow data generator (Y data generator) 44, a character γ conversion table 45a, a photography γ conversion table 45b, a halftone dot γ conversion table 45c, and selectors S2, S3, and S4.

The MAX data detector 31 compares the levels of color image data of C, M, and Y for the target pixel that are outputted from the image type discriminator 22, and outputs the maximum value of these three image data as max(C,M,Y) to the calculator 33.

The MIN data detector 32 compares the levels of color image data of C, M, and Y for the target pixel that are outputted from the image type discriminator 22, and outputs the minimum value of these three image data as min(C,M,Y) to the calculator 33 and to the multiplier 34.

The selector S1 outputs a select signal indicative of the judgment result by the image type discriminator 22 to the calculator 33, which, in turn, effects the following equation (1) using the values, max(C,M,Y) and min(C,M,Y), outputted from the MAX data detector 31 and the MIN data detector 32 to output the value α to the multiplier 34.

$$\alpha=1-\{\max(C,M,Y)-\min(C,M,Y)\}/\beta \quad (1)$$

where β is a predetermined constant value (coefficient). The calculator 33 stores three values β1, β2, and β3 as the selectable coefficient β.

Specifically, when the select signal outputted from the selector S1 represents that the outputted data belongs to the character region, the calculator 33 calculates the value α on the basis of β=β1; when the select signal outputted from the selector S1 represents that the outputted data belongs to the photography region, the calculator 33 calculates the value α on the basis of β=β2; and when the select signal outputted from the selector S1 represents that the outputted data belongs to the halftone dot region, the calculator 33 calculates the value α on the basis of β=β3.

It should be appreciated that the relationship between β1, β2, and β3 are such that β1>β2≈β3 (the mathematical notation "≈" indicates "approximately equal to"). In this embodiment, for instance, β1=300 and β2=β3=100.

The value α is set such that it becomes smaller as the difference between max(C,M,Y) and min(C,M,Y) widens. This means that the value α becomes insignificant as one of the data (C,M,Y) leaves away from black. In this sense, the value α indicates a weight for black data, and hereinafter referred to as "black weight indicia". It should be noted that when α<0, α is set at 0.

Next, the multiplier 34 calculates black data K based on the following equation (2), i.e., by multiplying the value min(C,M,Y) outputted from the MIN data detector 32 with the value α outputted from the calculator 33.

$$K=\alpha\cdot\min(C,M,Y) \quad (2)$$

The calculated value of black data K is outputted to the character UCR converter 35a, the photography UCR converter 35b, and the halftone dot UCR converter 35c.

The UCR converters 35a to 35c are memories each storing table data of 256×8 bit therein. On the basis of the table data stored in the converters 35a to 35c, an output value for black data BK is obtained from the corresponding black data K as an address, thus converting the black data K into the output value BK for each pixel (see FIGS. 3 to 5).

Figure 3:
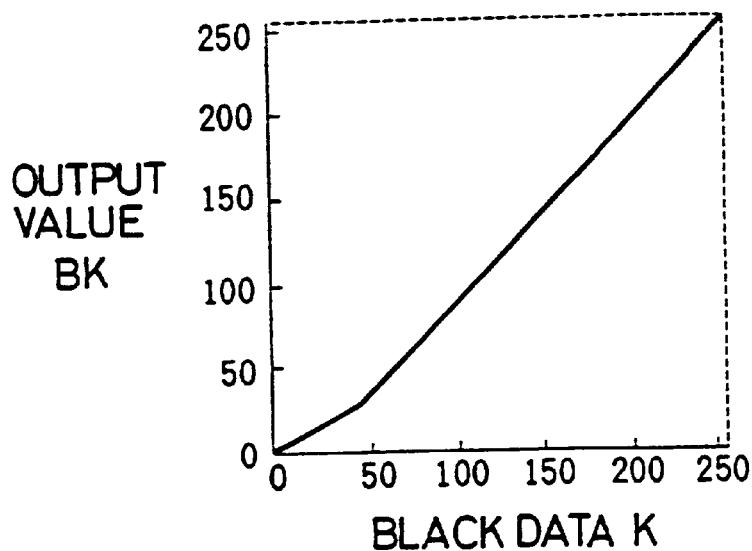
FIG. 3 is a graph of a table data stored in a character Under Color Removal (UCR) converter.

The character UCR converter 35a optimally converts the color image data when it is judged that the data belongs to the character region. As shown in the graph of FIG. 3, the table data of FIG. 3 gradually and linearly rises from the original point to K≈50, and then steeply rises compared to the first half portion (0≦K≦50). Finally, when K=255, the corresponding BK becomes 255. In this way, the output value BK after data conversion using the table data shown in FIG. 3 is outputted to the selector S2 and to the character γ conversion table 45a.

Figure 4:
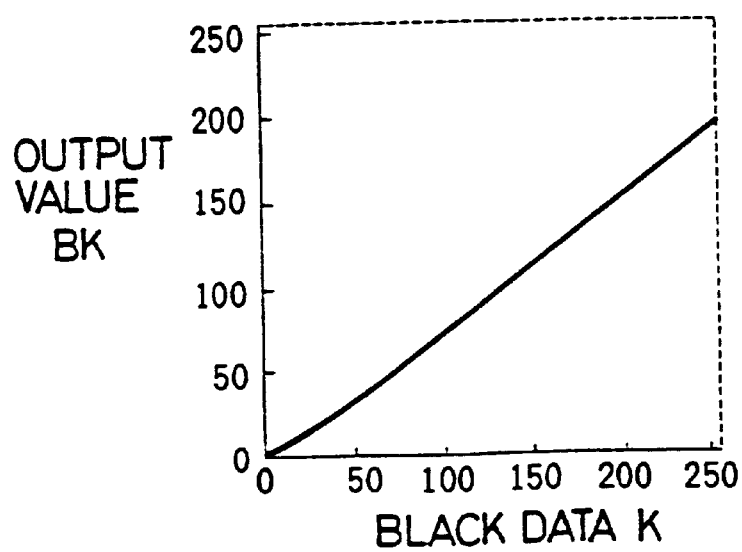
FIG. 4 is a graph of a table data stored in a photography UCR converter.

The photography UCR converter 35b optimally converts the color image data when it is judged that the data belongs to the photography region. As shown in the graph of FIG. 4, the table data of FIG. 4 gradually and linearly rises from the original point, and when K=255, BK≈195. In this way, the output value BK after data conversion using the table data shown in FIG. 4 is outputted to the selector S2 and to the photography γ conversion table 45b.

Figure 5:
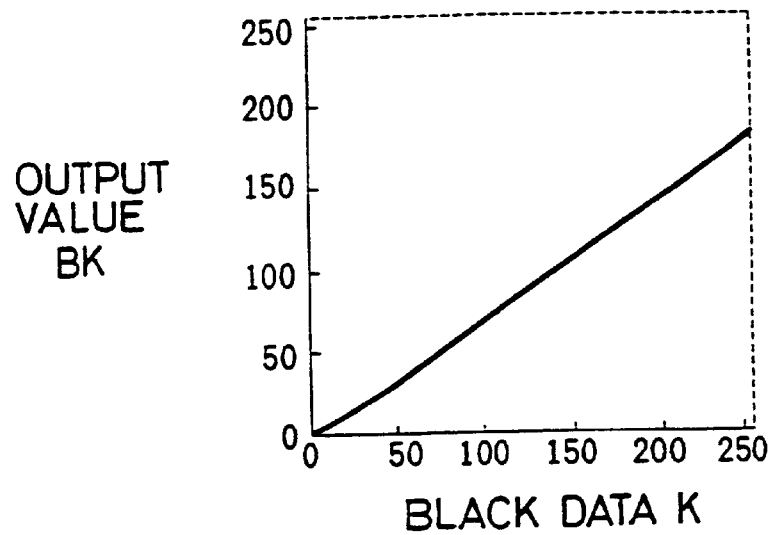
FIG. 5 is a graph of a table data stored in a halftone dot UCR converter.

Similar to the table data for the photography region, the halftone dot UCR converter 35c gradually and linearly rises from the original point as shown in the graph of FIG. 5, and when K=255, BK≈190. In this way, the output value BK after data conversion using the table data shown in FIG. 5 is outputted to the selector S2 and to the halftone dot γ conversion table 45c.

Referring back to FIG. 2, the selector S2 of the color corrector 24 selects the output value BK for black data corresponding to the judgment result by the image type discriminator 22 among the values BK outputted from the UCR converts 35a to 35c to output the selected value to the multiplier 41. The selector S3 outputs the select signal indicative of the judgment result (character image, photographic image, or halftone dot image) by the image type discriminator 22 to the multiplier 41.

The multiplier 41 multiplies the output value BK with a coefficient δ (δ·BK) to correct the output value BK to output the corrected value δ·BK to the C data generator 42, the M data generator 43, and the Y data generator 44. The multiplier 41 sets the multiplication result of δ·BK at 255 when the resultant data exceeds 8 bit.

The multiplier 41 stores δ1, δ2, and δ3 as the coefficient δ. When the select signal outputted from the selector S3 represents that the outputted data belongs to the character region, the multiplier 41 sets δ=δ1, when the select signal outputted from the selector S3 represents that the outputted data belongs to the photography region, the multiplier 41 sets δ=δ2, and when the select signal outputted from the selector S3 represents that the outputted data belongs to the halftone dot region, the multiplier 41 sets δ=δ3.

The C data generator 42, the M data generator 43, and the Y data generator 44 effect the following equation (3) based on the corrected value δ·BK which is outputted from the multiplier 41 to process Under Color Removal (UCR) process. Solving the equation (3) produces corrected color image data C', M', and Y' which have undergone the UCR process. The corrected color image data C', M', and Y' are outputted to the output color selector 25.

$$C' = C - \delta \cdot BK$$
$$M' = M - \delta \cdot BK$$
$$Y' = Y - \delta \cdot BK \quad (3)$$

The C data generator 42, the M data generator 43, and the Y data generator 44 set the values of C', M', and Y' at 0 when the calculation result of C', M', and Y'<0.

The γ conversion tables 45a to 45c are memories each storing table data of 256×8 bit therein. On the basis of the table data stored in the tables 45a to 45c, an output value for black data, BK', is obtained corresponding to the output value BK as an address, thus converting the black data BK into the output value BK' for each pixel. In this way, the γ characteristic of the image reader 1 is corrected (converted) to that of the imaging unit 4.

The selector S4 selects the output value BK' in accordance with the select signal indicative of the type of the image (character, photographic image, or halftone dot) outputted from the image type discriminator 22, among the values BK' outputted from the γ conversion tables 45a to 45c to output the selected value BK' to the output color selector 25.

Next, an operation of the image processing apparatus of this invention is described with reference to FIGS. 2 to 5.

First, as shown in FIG. 1, light reflected from a color document projected by the unillustrated light projector is converted into an electric signal (analog color image signal) by the photoelectric converter 11 to separate the light into three primary colors of R, G, and B. Then, the analog color image signals of R, G, and B are converted into digital color image data of R, G, and B of 8 bit. Subsequently, the density converter 12 converts the color image data of R, G, and B into color image density data of C, M, and Y respectively to output the resultant data to the input processor 21.

After the frequency of the reference clock signal in the image reader 1 is converted to that of the reference clock signal in the image processor 2 by the input processor 21, the color image data of C, M, and Y are synchronously stored in the FIFO memories M1, M2, and M3, respectively.

The color image data of C, M, and Y stored in the FIFO memories M1, M2, and M3 are readout therefrom and stored in the line memory 221 of the image type discriminator 22 for plural lines of pixel data. The image type discriminator 22 judges whether the color image data of C, M, and Y stored in the FIFO memories M1, M2, and M3 belong to the character region, the photography region, or the halftone dot region, and produces a select signal indicative of the judgment result. The produced select signal is outputted to the selectors S1, S2, and S3.

Meanwhile, the color image data of C, M, and Y stored in the FIFO memories M1, M2, and M3 are synchronously outputted per pixel via the image type discriminator 22 to the black data generator 23.

Next, as shown in FIG. 2, the MAX data detector 31 of the black data generator 23 detects the maximum value of the color image data of C, M, and Y, i.e., max(C,M,Y) for each pixel, and the MIN data detector 32 detects the minimum value of color image data of C, M, and Y, i.e., min(C,M,Y) for each pixel. The detected value max(C,M,Y) is outputted to the calculator 33, and the value min(C,M,Y) is outputted to the calculator 33 and to the multiplier 34.

Meanwhile, the select signal indicative of the judgement result by the image type discriminator 22 is outputted from the selector S1 to the calculator 33, which, in turn, solves the equation (1) using the coefficient β (β1, β2, β3) corresponding to the type of the image (character, photographic image, or halftone dot) to obtain the calculation result α. Then, the value α is outputted to the multiplier 34, which, then, solves the equation (2) to obtain the black data K. The obtained black data K is outputted to the UCR converters 35a, 35b, and 35c.

Next, the UCR converters 35a to 35c convert the black data K into the output value BK for black data according to the table data shown in FIGS. 3 to 5. The output values BK generated by the converters 35a to 35c are outputted to the selector S2 of the color corrector 24 and to the γ conversion tables 45a to 45c.

The selector S2 selects the output value BK in accordance with the select signal indicative of the judgment result by the image type discriminator 22, among the values BK to output the selected value to the multiplier 41. Likewise, the selector S3 outputs the select signal indicative of the judgement result by the image type discriminator 22 to the multiplier 41.

The multiplier 41 multiplies the selected output value BK with the coefficient δ (δ1, δ2, δ3) which is set in accordance with the select signal outputted from the selector S3 to correct the output value BK and to output the corrected value δ·BK to the C data generator 42, the M data generator 43, and to the Y data generator 44.

Subsequently, the C data generator 42, the M data generator 43, and the Y data generator 44 effect the equation (3) to produce the color image data of C', M', and Y' which have been subject to UCR process. The produced color image data of C', M', and Y' are outputted to the output color selector 25.

Meanwhile, the γ conversion tables 45a to 45c perform γ correction to the output values BK which have been outputted respectively from the converters 35a to 35c to produce the corrected values BK'. The values BK' which have been subject to γ conversion are outputted to the selector S4. The selector S4 selects the value BK' in accordance with the select signal indicative of the judgement result by the image type discriminator 22, among the values BK' outputted from the γ conversion tables 45a to 45c, and outputs the selected value BK' to the output color selector 25.

The output color selector 25 selects, e.g., color image data Y' among the image data of C', M', Y' and, BK', and outputs the Y' data to the magnifier 26, which, in turn, magnifies or reduces the Y' data according to the set magnification/reduction ratio.

Subsequently, the Y' data is outputted from the magnifier 26 to the spatial filter 27 where the data is subject to edge emphasis when the image type discriminator 22 judges that the data belongs to the character region. On the other hand, the Y' data is subject to smoothing when the image type discriminator 22 judges that the data belongs to the photography region or to the halftone dot region.

Next, the gradation processor 28 performs gradation correction to the Y' data, and the output controller 29 controls light emission of the laser emitter 3 in accordance with the Y' data which have been subject to the above various processes in the image processor 2.

Having completed all the processes, light corresponding to the color image data of Y' is emitted by the laser emitter 3 onto the surface of the photoreceptor of the imaging unit 4 which have been charged to a certain potential level to form an electrostatic latent image on the photoreceptor surface. The electrostatic latent image is developed into a toner image of yellow using yellow toner, and the Y toner image is transferred onto a copy sheet transported to the photoreceptor.

Then, when the output color selector 25 selects, e.g., color image data of M', similar to the above processes conducted to the Y' data, a toner image of magenta is superimposedly transferred onto the copy sheet using color toner of magenta. Then, when the output color selector 25 selects color image data of C', similar to the above processes conducted to the Y' and M' data, a toner image of cyan is superimposedly transferred onto the copy sheet using color toner of cyan. Finally, when the output color selector 25 selects image data of BK', a black toner image is superimposedly transferred onto the copy sheet. In this way, after the four color toner images of C', M', Y', and BK' are successively and superimposedly transferred onto the same copy sheet, the transferred toner images are fixed thereon by a fixing unit.

As mentioned above, the black weight indicia $\alpha$ is set such that the black weight decreases as the difference between max(C,M,Y) and min(C,M,Y) widens, i.e., the color image data is remotely away from black, and the black weight indicia $\alpha$ having such property is used as a multiplier to produce black data: K=$\alpha$·min(C,M,Y). With this arrangement, undesirable mingle of black color into green or blue can be effectively prevented, and color reproductivity is improved.

Further, as shown in FIGS. 3 to 5, the output value BK gradually rises from K=0. Accordingly, black data is accurately generated even for the lower gradation level (low density level). Thereby, reproductivity of gray color in the low density is improved, and a black component in the color image data of C, M, and Y is efficiently converted into black data BK.

Further, according to this invention, the superimposed amount of four color toners of cyan, magenta, yellow, and black can be suppressed as much as possible. Accordingly, an image transferability is improved, while avoiding an unfavorable gloss (luster) on the finished color image, resulting in an improvement of the finished state of the transferred toner image.

Figure 6:
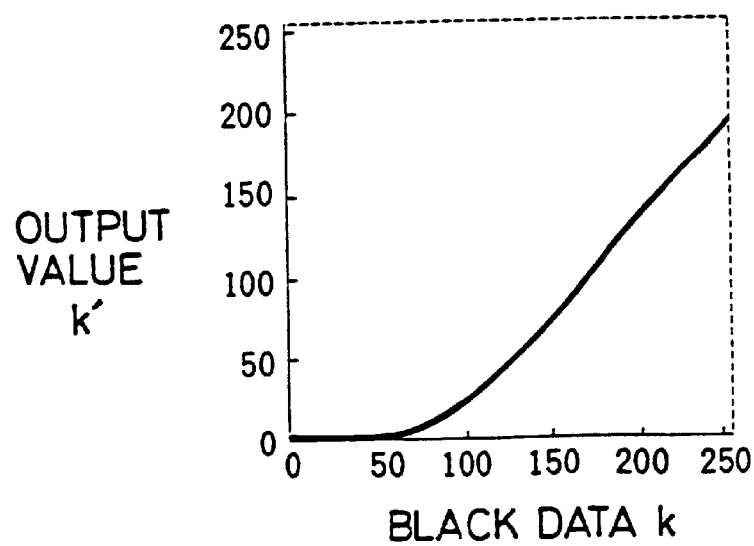
FIG. 6 is a graph of a table data used in converting black data into an output value for the black data according to the prior art.

Moreover, as mentioned in the section of description of the prior art, the conventional image processing apparatus with the two-stage setting process for the output value k', as shown in FIG. 6, where the output value k' abruptly rises at the gradation level of k$\approx$60, has suffered from formation of a pseudo-contour-image. However, according to this invention, as shown in FIGS. 3 to 5, the output value BK gradually rises from K=0. Accordingly, there can be eliminated formation of such a pseudo-contour-image. Further, the conversion from K to BK can be expressed by a simple function (a linear equation).

Further, the image type discriminator 22 judges the type of an image to be processed, and the black data K is optimally converted into the corresponding output value BK in accordance with the judgement result by the image type discriminator 22 using the table data stored in the UCR converters 35a to 35c. Thereby, the optimum output value BK can be obtained according to the type of the image.

Furthermore, when the image type discriminator 22 judges that the output data is in the character region, the black weight indicia $\alpha$ is set to approach 1 as much as possible by setting $\beta$ to be $\beta$1 to make the influence of the term in the bracket {max(C,M,Y)−min(C,M,Y)} insignificant. In this way, a very clearer and vivid character image can be obtained.

The present invention is not limited to the above embodiment, and can take the form of the following modifications (1) to (7).

(1) In place of the image type discriminator 22, the image processing apparatus of this invention may be provided with a document type setting key for setting the type of the document (a document carrying a character image, a photographic image, or a halftone dot image). In this modification, the calculator 33 may set the appropriate coefficient $\beta$ among $\beta$1, $\beta$2, and $\beta$3 according to the type of the document designated by an operator. Thereby, the arrangement of the image processor 2 can be simplified.

(2) In the foregoing embodiment, the coefficient $\beta$ used in the calculator 33 is set such that $\beta$1=300, $\beta$2=$\beta$3=100. However, the coefficient $\beta$ is not limited to this, and may preferably be set in the relation: $\beta$1>$\beta$2$\approx$$\beta$3 without departing from the spirit of this invention.

(3) In the above embodiment, the table data stored in the halftone dot UCR converter 35c shown in FIG. 5 is slightly different from that in the photography UCR converter 35b shown in FIG. 4. Alternatively, the table data in the converters 35b and 35c may be identical to each other. With this modification, one memory can be omitted, and the arrangement of the apparatus as a whole can be simplified.

(4) In the aforementioned embodiment, the table data in the character UCR converter 35a is different from that in the photography UCR converter 35b. Alternatively, the table data in the converters 35a and 35b may be identical to each other. Further, the table data in the photography UCR converter 35b shown in FIG. 4 may be used as table data common to the converters 35a, 35b, and 35c. In this modification, similar to the embodiment, a clear character image can be obtained by setting $\beta$1$\gg$$\beta$2 such that $\beta$1 is in the range of 350 to 400. Note that the mathematical notation "$\gg$" means "much greater than". In this modification, one or two memories can be omitted, thereby simplifying the arrangement of the apparatus.

(5) As shown in FIGS. 3 to 5, the output value BK is obtained from the black data K on the basis of the linear expression. Accordingly, the converters 35a, 35b, and 35c may be a calculator for performing data conversion according to the functions (the linear expressions) shown in FIGS. 3 to 5, in place of the memories in which the table data are stored.

With this modification, the memories for storing table data can be omitted, thereby simplifying the logic circuit constituting the black data generator 23, as well as reducing production cost for the parts of the apparatus.

(6) In the foregoing embodiment, the black data generator 23 and the color corrector 24 consist of a logic circuit, and data is processed by the hardware. In place of this arrangement, the black data generator 23 and the color corrector 24 may consist of a high speed microcomputer, and data may be processed by a software.

(7) The present invention has been described in terms of a color digital copier provided with the image reader 1. The present invention is applicable to a data processor in which a separately provided image reader (image scanner) reads an image of an original document to allow a personal computer to process the read image data of the original document.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An image processing apparatus comprising:
a color separator for separator an inputted image into a plurality of colors for each pixel to generate color image data; QMY
a maximum value detector for detecting a maximum value of the color image data;
value of the color image data;
a minimum value detector for detecting maximum value of the color image data; and
a black generator for generating black data by using a difference between the maximum value and the minimum value of the color image data and the minimum value of the color image data as parameters to set an output value for the black data, wherein,
a constant value storage unit for storing a predetermined constant value therein;
a calculator for solving the equation (A) to determine the value K; and
an output controller for setting the output value for the black data corresponding to the value K, K=min (C,M,Y) 1-[max (C,M,Y)-min (C,M,Y)

wherein:
C'M'Y: color image data of three primary colors, cyan (C), magenta (M), and yellow (Y);
max(C,M,Y): maximum value of color image data;
min(C,M,Y): minimum value of color image data; and
β: predetermined constant value.

2. The image processing apparatus according to claim 1, wherein the color separator separates the inputted image into three primary colors for each pixel to generate the color image data.

3. The image processing apparatus according to claim 2, wherein the output controller generates the output value for the black data substantially proportional to the value K.

4. The image processing apparatus according to claim 2, wherein the output controller includes a table data storage unit for storing table data in which predetermined output values for the black data are stored corresponding to the input values K.

5. The image processing apparatus according to claim 2, wherein the output controller includes a function calculator for calculating the output value for the black data as a function of the value K.

6. The image processing apparatus according to claim 2, further comprising an image type discriminator for discriminating whether the pixel of the color image data belongs to a region of a character image or a region of a photographic image, the constant value storage unit stores a first constant value corresponding to the character region and a second constant value smaller than the first constant value and corresponding to the photography region therein, and
the calculator solves the equation (A) by substituting the first constant value into β when it is judged that the pixel belongs to the character region, and substituting the second constant value into β when it is judged that the pixel belongs to the photography region.

7. The image processing apparatus according to claim 6, wherein the image type discriminator judges whether the pixel belongs to a region of a halftone dot image, the constant value storage unit further stores a third constant value smaller than the first constant value and corresponding to the halftone dot region therein, and the calculator solves the equation (A) by substituting the third constant value into β when it is judged that the pixel belongs to the halftone dot region.

8. The image processing apparatus according to claim 1, further comprising a color corrector for correcting the color image data according to an Under Color Removal (UCR) process based on the generated output value for the black data.

9. An image processing apparatus comprising:
a color separator for separating an inputted image into a plurality of colors for each pixel to generator color image data;
a maximum value detector for detecting a maximum value of the color imgage data for said each pixel;
a minimum value detector for detecting a minimum value of the color image data for said each pixel; and a black data generator for generating black data by using a difference between the maximum value and the minimum value of the color image data and the minimum value of the color image data for said each pixel as parameters to set an output value for the black data for said each pixel, wherein the black data generator includes a constant value storage unit for storing a predetermined constant value therein;
a calculator for solving the equation (A) to determine the value K; and
an output controller for setting the output value for the black data corresponding to the value K, K=min (C,M,Y)·{max(C,M,Y)-min (C,M,Y)/β}  (A)

where:
C'M'Y: color image data three primary colors, cyan (C), magenta (M), and yellow (Y)
max(C,M,Y): maximum value of color image data;
min(C,M,Y): minimum value of color image data; and
β: Predetermined constant value.

* * * * *